US012006189B2

(12) United States Patent
Van Veluw et al.

(10) Patent No.: US 12,006,189 B2
(45) Date of Patent: Jun. 11, 2024

(54) HEAVE COMPENSATED DUAL HOIST CRANE

(71) Applicant: ITREC B.V., Schiedam (NL)

(72) Inventors: Cornelis Martinus Van Veluw, Schiedam (NL); Wing Sum Lee, Schiedam (NL); Ken Van Oijen, Schiedam (NL)

(73) Assignee: ITREC B.V., Schiedam (NL)

(*) Notice: Subject to any disclaimer, the term of this patent is extended or adjusted under 35 U.S.C. 154(b) by 429 days.

(21) Appl. No.: 17/601,243

(22) PCT Filed: Apr. 3, 2020

(86) PCT No.: PCT/NL2020/050230
§ 371 (c)(1),
(2) Date: Oct. 4, 2021

(87) PCT Pub. No.: WO2020/204719
PCT Pub. Date: Oct. 8, 2020

(65) Prior Publication Data

US 2022/0162045 A1 May 26, 2022

(30) Foreign Application Priority Data

Apr. 5, 2019 (NL) ...................................... 2022877

(51) Int. Cl.

| | |
|---|---|
| ***B66C 23/52*** | (2006.01) |
| ***B66C 19/00*** | (2006.01) |
| *B66C 23/82* | (2006.01) |

(52) U.S. Cl.
CPC .............. *B66C 23/52* (2013.01); *B66C 19/00* (2013.01); *B66C 23/823* (2013.01)

(58) Field of Classification Search
CPC ......... B66C 23/53; B66C 13/02; B66C 13/10; B66C 23/52; B66C 23/525; B63B 27/10;
(Continued)

(56) References Cited

U.S. PATENT DOCUMENTS

| | | | |
|---|---|---|---|
| 840,684 A | 1/1907 | Bode et al. | |
| 4,838,522 A * | 6/1989 | Calkins .................. | B66C 23/52 254/387 |

(Continued)

FOREIGN PATENT DOCUMENTS

| | | | |
|---|---|---|---|
| EP | 2 896 589 | A1 | 7/2015 |
| WO | WO 2011/034422 | A2 | 3/2011 |

(Continued)

OTHER PUBLICATIONS

Dutch Search Report, issued in Priority Application No. 2022877, dated Dec. 20, 2019.

(Continued)

*Primary Examiner* — Sang K Kim
*Assistant Examiner* — Nathaniel L Adams
(74) *Attorney, Agent, or Firm* — Birch, Stewart, Kolasch & Birch, LLP

(57) ABSTRACT

A dual hoist crane is provided with a heave compensation system that can be used for both the main and for the auxiliary hoisting assembly. The heave compensation system includes a first set of sheaves for guiding the main hoisting cable and a second set of sheaves for guiding the auxiliary hoisting cable. The heave compensation system is configured to individually lock the first set of sheaves and the second set of sheaves to a heave compensation cylinder, for respectively providing the main hoisting assembly and the auxiliary hoisting assembly with heave compensation.

20 Claims, 8 Drawing Sheets

(58) Field of Classification Search
CPC ......... B63B 27/12; B63B 27/30; B63B 27/32; B63B 27/36
See application file for complete search history.

(56) References Cited

U.S. PATENT DOCUMENTS

| | | | | |
|---|---|---|---|---|
| 6,926,259 | B1 * | 8/2005 | Roodenburg .......... | B66D 3/043 254/338 |
| 6,935,262 | B2 * | 8/2005 | Roodenburg ........... | B63C 11/42 405/191 |
| 9,290,362 | B2 | 3/2016 | Hey | |
| 2012/0156003 | A1 * | 6/2012 | Battersby ................ | B66C 23/52 414/803 |
| 2014/0263142 | A1 * | 9/2014 | Billiot ..................... | B66C 23/52 267/141 |

FOREIGN PATENT DOCUMENTS

| | | | |
|---|---|---|---|
| WO | WO 2016/062812 | A1 | 4/2016 |
| WO | WO 2018/151593 | A1 | 8/2018 |

OTHER PUBLICATIONS

International Search Report, issued in PCT/NL2020/050230, dated Jul. 30, 2020.

Written Opinion of the International Searching Authority, issued in PCT/NL2020/050230, dated Jul. 30, 2020.

* cited by examiner

HEAVE COMPENSATED DUAL HOIST CRANE

This invention relates to a dual hoist crane provided with a heave compensation device.

Dual hoist cranes, the crane comprising a main hoisting assembly and an auxiliary hoisting assembly, are generally known. Typically, the crane comprises a boom, supporting the main hoisting cable at its' top end, which boom is provided at that top end with a jib for supporting an auxiliary hoisting cable. Providing the boom with a jib enhances the reach of the crane. For example, a dual hoist crane is disclosed in U.S. Pat. No. 840,684.

It is known to provide an offshore crane with a heave compensation system. Such a crane is for example disclosed in U.S. Pat. No. 9,290,362. If a dual hoist crane is provided with a heave motion compensation system, heave compensation is often only provided for the main hoisting assembly. In those cases where both the main and auxiliary hoisting assembly are provided with heave compensation, typically each hoisting assembly is provided its own, dedicated heave compensation system.

Providing a crane with two heave compensation systems increases the production costs of the crane. Furthermore, the heave compensation systems are voluminous, and thus require space in the crane or on the vessel.

A dual hoist crane, in the form of a multi purpose tower, comprising a heave compensation system is for example known from WO2011034422. The dual hoist crane comprises a main hoisting assembly, provided with a heave compensation system associated with the main hoisting cable, and a deep water hoisting assembly. A releasable attachment mechanism, designed for interconnecting the main hoisting cable and the deepwater hoisting cable, is provided. Thus, the heave compensation system associated with the main hoisting cable is operable in combination with the deepwater hoisting cable.

The releasable attachment mechanism located on the travelling pulley block of the main hoisting assembly, and is configured to engage the deepwater hoisting cable such that the deepwater hoisting cable and the main hoisting cable are interconnected. Subsequently the main hoisting assembly is used to support the weight of the deepwater hoisting cable and the object supported by the deepwater cable. When the load of the deepwater cable and the object are supported by the main hoisting assembly, the heave compensation system is able to provide heave compensation, i.e. to dampen the effect of the movement of the vessel onto an object supported by the main hoisting cable.

It is submitted that, because the main hoisting cable has to be connected with the deep water cable, the free hanging section of the main hoisting cable and the free hanging section deep water cable have to be in, or have to be brought into, the vicinity of each other. This requires a specific set up of the crane.

Furthermore, sharing the heave compensation system requires a releasable attachment mechanism configured to directly engage a cable in such a manner that loads can be transferred to that cable. Such a releasable attachment mechanism may be complicated and voluminous, and has to be moveably supported to enable the heave compensation to be provided. Also, once the cables are interconnected, the deep water winch and the has to follow the main hoisting winch, to keep the cables parallel and prevent slack and increased tension in the deep water cable. Also, the heave compensation can only be provided within the range of the main hoisting cable, or along the trajectory of the releasable attachment mechanism.

It is an general object of the invention to provide an alternative dual hoist crane with a heave compensation system for both a main hoisting assembly and an auxiliary hoisting assembly of the dual hoist crane.

It is a further object of a first aspect of the invention to provide a dual hoist crane in which the above mentioned drawbacks are eliminated altogether or occur in a greatly reduced extent.

It is a further object of the invention to provide an alternative heave compensation system, more in particular an improved heave compensation system, configured to provide heave compensation for both a main hoisting assembly and an auxiliary hoisting assembly.

According to the present invention, one or more of the above mentioned objects are achieved by designing a dual hoist crane acceding to claim 1.

A dual hoist crane according to the claimed invention comprises a dual hoist heave compensation system that is configured to be used with the main hoisting assembly and with the auxiliary hoisting assembly.

The dual hoist heave motion compensation system comprises a heave compensation cylinder, a first set of sheaves, associated with the main hoisting cable, and a second set of sheaves associated with the auxiliary hoisting cable. The dual hoist heave motion compensation system is configured to be coupled with the first set of sheaves to provide the main hosting assembly with heave compensation and with the second set of sheaves to provide the auxiliary hoisting assembly with heave compensation.

Thus, the invention provides a dual hoist crane with an alternative heave compensation system, to provide a dual hoist crane with heave compensation for both a main hoisting assembly and an auxiliary hoisting assembly of the dual hoist crane.

Because the dual hoist heave compensation system according to the invention can be used with both the main hoisting assembly and with the auxiliary hoisting assembly, it is no longer necessary to provide each hoisting assembly with a dedicated heave compensation system. Also, there is no need for a releasable attachment mechanism for interconnecting the main hoisting cable with the auxiliary hoisting cable. Thus the invention allows for a more compact and/or low cost configuration of the dual hoist crane, more in particular for the heave compensation system of the dual hoist crane.

Also, the dual hoist heave compensation system does not require the free hanging section of the main hoisting cable and the free hanging section auxiliary hoisting cable to be in, or have to be brought into, the vicinity of each other. This allows for the dual hoist heave compensation system to be used with many crane set ups.

A dual hoist crane according to the claimed invention comprises:

- a crane structure;
- a boom, the boom having an inner end, a midsection and an outer end, which boom is pivotable supported by the crane structure such that it can be pivoted about a substantially horizontal boom axis;
- a main hoisting assembly, for lifting and lowering a load, the main hoisting assembly comprising a main hoisting winch and an associated main hoisting cable, and a mainload suspension device;
- an auxiliary hoisting assembly for lifting and lowering a load, the auxiliary hoisting assembly comprising an auxiliary hoisting winch and an associated auxiliary hoisting cable, and an auxiliary load suspension device;

a dual hoist heave motion compensation system, the heave motion compensation system comprising:

a support frame;

a heave compensation cylinder, having a cylinder body mounted on the support frame and a cylinder rod, which heave compensation cylinder is connected to a gas buffer to enable passive heave compensation;

a sheave head, wherein the sheave head is supported by the cylinder rod for movement along a heave compensation trajectory;

a sheave dock, mounted on the support frame at an end of the heave compensation trajectory;

a first set of sheaves guiding the main hoisting cable of the main hoisting assembly;

a second set of sheaves guiding the auxiliary hoisting cable of the auxiliary hoisting assembly;

wherein the main hoisting cable extends from the main hoisting winch along the heave compensation trajectory, via the first set of sheaves, and via at least one main hoisting sheave at the outer end of the boom to the main load suspension device, wherein the auxiliary hoisting cable extends from the auxiliary hoisting winch along the heave compensation trajectory, via the second set of sheaves, and via at least one auxiliary hoisting sheave at the outer end of the boom, preferably at an outer end of a jib, to the auxiliary load suspension device, and wherein the dual hoist heave motion compensation system is configured to individually lock the first set of sheaves and the second set of sheaves to the sheave head, for respectively providing the main hoisting assembly and the auxiliary hoisting assembly with heave compensation, and to individually lock the first set of sheaves and the second set of sheaves to the sheave dock, for respectively not providing the main hoisting assembly and the auxiliary hoisting assembly with heave compensation, and the dual hoist heave motion compensation system thus enables for providing only the main hoisting assembly with heave compensation and for providing only the auxiliary hoisting assembly with heave compensation.

According to the claimed invention, the hoisting assemblies are configured such that the main hoisting cable and the auxiliary hoisting cable run along the heave compensation trajectory of the heave compensation assembly, and are both guided via sheaves of the heave compensation assembly. Furthermore, the heave compensation cylinder is configured to be switched between use with the sheaves guiding the main hoisting cable and use with the sheaves guiding the auxiliary hoisting cable. Thus the invention provides an efficient way to share the functionality of the heave compensation cylinder between the main hoisting assembly and the auxiliary hoisting assembly.

It is submitted that the heave compensation system according to the invention may comprise a single heave compensation cylinder or may comprise a combination of multiple heave compensation cylinders.

The heave compensation cylinder or heave compensation cylinders are coupled to a gas buffer. The gas buffer may be part of the heave compensation system, or may be a separated component. Preferably, the gas buffer is mounted in the vicinity of the heave compensation system, for example is mounted on the heave compensation cylinder and/or to the support frame of the heave compensation system.

In an embodiment, the sheaves of the first set of sheaves and the sheaves of the second set of sheaves are configured to be locked to the sheave head, for example to be bolted to the sheave head, or to be locked to the sheave dock, for example to be bolted to the sheave dock.

For example, the sheave may each comprise a sheave holder provided with locking devices, for example apertures for receiving a securing rod, or the sheave holders may be configured to be bolted to the sheave head and to the sheave dock. Mounting the sheaves individually the sheave head and the sheave dock allows for a compact configuration of the heave compensation system.

In an embodiment, each sheave is provided with a sheave holder, which sheave holder comprises a sheave holder body in which the sheave is rotatable mounted, and a sheave head couple section and a sheave dock couple section, on opposite sides of the sheave holder body, for engaging and coupling with the sheave head and the sheave dock respectively.

In a further preferred embodiment, the sheave head couple section and/or the sheave dock couple section are beaks configured for engaging a beam like sheave head and a beam like sheave dock. Preferably, the beaks are shaped, e.g. narrow in a direction towards the sheave, for guiding the sheave holder in a correct locking position relative to the sheave head and sheave dock.

In a preferred embodiment, the sheave holder is provided with locking devices, configured to cooperate with locking devices provided on the sheave head and the sheave dock, for locking the sheave holder, and thus the sheave held by the sheave holder, in a locking position relative to the sheave head and the sheave dock.

In an alternative embodiment, the sheaves of the first set and the sheaves of the second set are mounted in a first sheave block and a second sheave block respectively, and wherein the first sheave block and the second sheave block are configured to be mounted to the sheave head and to be mounted to the sheave dock, to lock the sheaves to the sheave head and to lock the sheaves to the sheave dock respectively.

In such an embodiment, the sheaves of a single set can be locked all at once to the sheave head or the sheave dock. This facilitates the locking process. It is submitted that the it is also possible to mount the sheaves of a set in multiple sheave blocks, for example to mount six sheaves in two sheave blocks, each sheave block comprising three sheaves.

In a further embodiment, the dual hoist crane further comprises locking devices for locking the sheaves, or the sheave blocks in which the sheaves are mounted, to the sheave head and the sheave dock, wherein the locking devices preferably comprise one or more locking pins moveable between a locked position into a locking hole and an unlocked position.

In an embodiment, the locking devices comprise one or more actuators, for example hydraulic cylinders or electric spindles, for semi automatically locking the sheaves, or sheave blocks, to the sheave sheave head or the sheave dock.

The sheaves or sheave blocks are in a locking position, when locked to the sheave dock. It is submitted that the heave compensation trajectory preferably ends prior to this locking positions. Thus, the sheaves supported by the sheave head are not moved into the locking position when they are moved by the heave compensation cylinder during heave compensation.

Preferably, the heave compensation cylinder is configured to move the sheave head along the heave compensation trajectory. Preferably, the cylinder is configured to extend beyond the heave compensation trajectory to position the sheaves locked to the sheave head in a locking position, in which locking position the sheaves can be locked to the sheave dock, and in which locking position the sheaves locked to the sheave dock can be locked to the sheave head.

In addition, or as an alternative, the sheave dock may be moveably supported, such that the sheave dock can be moved towards the sheave head, when the heave compensation is in an extended position, to position sheaves in a locking position in which they can be locked to both the sheave head and the sheave dock.

In an alternative embodiment, the heave compensation assembly comprises a sheave transfer device, which sheave transfer device is configured to transfer the sheaves between a locking position relative to the sheave head, for locking the sheaves to the sheave head, and a locking position relative to the sheave dock, for locking the sheaves to the sheave dock. Such a sheave transfer device may comprise a trolley to which the sheaves can be mounted, which trolley can be moved, for example by way of cables and a winch or by way of hydraulic cylinders, along a trolley track to move the sheaves between the respective locking positions.

Furthermore, sheaves, sheave blocks, and the sheave head and sheave dock are preferably provided with cooperating guide devices, for guiding the sheaves or sheave blocks into the correct locking position It is submitted that the heave compensation system according to the claimed invention preferably is mounted in the crane, for example in the crane structure, or, if present mounted to a gantry or to a boom of the crane.

As an alternative, the heave compensation system can be located below the crane structure, for example in a pedestal of the crane, or within the hull of the vessel. In such an embodiment, the hoisting cables of the main hoisting assembly and the auxiliary hoisting assembly are guided via sheaves from the crane to the heave compensation system and back to the crane.

In an embodiment, the dual hoist crane further comprises a slew bearing arranged for pivoting the crane structure about a vertical crane pivot axis.

In an embodiment, the dual hoist crane according to the invention is a mast crane or a pedestal mounted crane.

In an embodiment, the dual hoist crane comprises a luffing assembly for pivoting the boom up and down, the luffing assembly comprising:

- a luffing winch and an associated luffing cable; and
- a gantry, the gantry supporting a luffing cable sheave for guiding the luffing cable from the luffing winch to the outer end of the boom.

In a further embodiment, the gantry comprises a back stay and a back frame, which back stay and back frame are both at a lower end pivotably mounted to the crane structure, for pivoting about a substantially horizontal back stay pivot axis and back frame pivot axis respectively, and are both at an upper end pivotably connected to each other, wherein the back frame is located between the back stay and the boom, and wherein the backstay comprises a lower frame section and an upper frame section, which lower frame section and upper frame section are pivotably connected, and wherein the gantry can be lowered by pivoting the lower frame section relative to the upper frame section.

By providing the dual hoist crane with such a gantry, the overall height of the crane, in particular the gantry of the crane, can be reduced, which enables passing bridges. Such a gantry frame is in particular beneficial by large sized boom cranes because for this type of cranes a gantry is extra useful in supporting the boom and luffing cables, but at the same time has as a drawback that it increases the size of the crane which reduces bridge passing capacity of the vessel on which the crane is mounted.

In yet a further embodiment, the support frame of the heave motion compensation system is mounted in the backstay of the gantry, preferably is mounted in the upper frame section of the back stay, preferably the support frame is an integral part of the back stay.

Providing the dual hoist heave motion compensation system in the gantry, instead of for example a pedestal of the crane or below the crane in the vessel, allows for utilising the frame of the back stay as the dual hoist heave compensation system frame. this allows for a compact and efficient configuration of the duel hoist heave compensation system.

In a further embodiment, the luffing winch is mounted to the crane structure, e.g. is mounted to the gantry, near the back frame pivot axis. This is in particular beneficial when the gantry is configured to be folded into a lowered position, as will be set out below.

In a further embodiment, the luffing assembly comprises a luffing cable guide arm, supporting the at least one luffing cable sheave, which guide arm preferably is pivotably mounted to the back frame, the guide arm comprising the at least one boom side sheave, which luffing cable sheave and boom side sheave are spaced relative to each other, for guiding the luffing cable to the boom and spacing part of the luffing cable at a distance from the back stay.

Providing such a luffing cable guide arm prevents the luffing cable to be supported too close to the frame of the gantry, and provide an improved angle for the luffing cables for luffing the boom out of its lowered position, and thus facilitates the luffing process.

In an embodiment, the dual hoist crane further comprise a tugging track, which tugging track is mounted to the boom and extends along the boom, for guiding a tug-trolley along the length of the boom, which tug trolley is configured to support cables, e.g. is provided with one or more winches, to be linked to a load supported by the main or auxiliary hoisting assembly, to reduce swing of said load, and preferably position the load relative to the boom.

The tugging track mounted tug trolley allows for providing additional support for a load hoisted by the dual hoist crane, in particular allows for reduced, or even prevents, swing of the load supported by the crane. In the prior art, tugging cables are used that originate from tugging installations mounted on the deck of the vessel. These tugging cables need to be longer than tugging cables originating from a winch mounted on the tugging trolley that is supported on the boom. The comparatively short tugging cables improve control over the load supported by the crane. Furthermore, the tugging track allows for optimal positioning of the tug trolley relative to the load supported by the crane. Depending on the load and the conditions, the tugging trolley can be positioned above, below, or level with the load supported by the hoisting cable of the crane.

Furthermore, the tugging track enables the tugging trolley to move along the boom while the load is raised or lowered, thus maintaining the optimal position during the lowering and/or lifting of the load.

In an embodiment, the boom is provided with a jib, wherein the jib is mounted at an outer end of the boom, and wherein the main hoisting cable is supported at the outer end of the boom and the auxiliary hoisting cable is supported at the outer end of the jib. It is submitted that by supporting the auxiliary hoisting cable by a jib, the reach of the crane is increased, without the need for a longer, and thus heavy, boom.

In an embodiment, the number of sheaves of one set, e.g. the first set, is even, and wherein the sheaves of that set are divided into two subsets, each subset comprising the same number of sheaves, and each subset having a sheave head locking position and a sheave dock locking position, in which they are locked to the sheave head and to the sheave dock respectively, wherein the locking positions of the subsets are spaced relative to each other, wherein the sheaves of the other set, e.g. the second set, have a sheave head locking position and a sheave dock locking position, in which they are locked to the sheave head and to the sheave dock respectively, and wherein the sheave head locking position and the sheave dock locking position of the other set are located between the sheave head locking position and the sheave dock locking position of the subsets.

This configuration allows for an even load distribution, independent on which of the sets is locked to the heave compensation cylinder, or heave compensation cylinders, supporting the sheaves during heave compensation.

It is submitted that the heave compensation cylinder, in particular in its extend position, is susceptible to load forces that are not in line with the working axis of the cylinder. Typically, a cylinder of a robust design is used to compensate for suboptimal loading. The above disclosed configuration allows for less robust, thus compacter and lighter, heave compensation cylinders.

Preferably, the sheave head locking position and the sheave dock locking position of the other set, in the above example the second set, are located on a central axis of the heave compensation cylinders, or on a combined central axis of multiple heave compensation cylinders. In such an embodiment, the sheave head locking position and the sheave dock locking position of the subsets are located on opposite sides of that central axis.

The invention furthermore provides a dual hoist heave compensation system for use in a dual hoist crane according to one or more of the preceding claims.

It is submitted that a dual hoist heave compensation system according to the claimed invention can also be used in other types of cranes, i.e. in cranes without a boom. For example, in an embodiment, the dual hoist heave compensation system according to the invention is provided in a multi purpose tower. In such an embodiment, sections of the main hoist assembly cable and the auxiliary hoist assembly cable run parallel and adjacent the outside of the tower. Furthermore, in such an embodiment, the heave compensation system is preferably provided inside the tower, or in the vessel below the tower, such that it is sheltered from the environment.

The invention furthermore provides a vessel provided with a dual hoist crane according to the invention.

The invention furthermore provides a method for hoisting a load using a dual hoist crane according to the invention, the method comprising the steps:

- locking the first set of sheaves to the sheave head and locking the second set of sheave to the sheaves dock, and
- hoisting a load with the main hoisting assembly while providing the main hoisting cable with heave motion compensation using the heave motion compensation system, and/or
- locking the second set of sheaves to the sheave head and locking the first set of sheave to the sheaves dock, and hoisting a load with the auxiliary hoisting assembly while providing the auxiliary hoisting cable with heave motion compensation using the heave motion compensation system.

The invention furthermore provides a method for changing the dual hoist heave compensation system according to the invention between providing heave compensation for the main hoisting assembly and providing heave compensation for the auxiliary hoisting assembly, the method comprising the steps:

- moving the sheave head, supporting the first set of sheaves, towards the dock, supporting the second set of sheaves, by extending the heave compensation cylinder, or heave compensation cylinders;
- locking the first set of sheaves to the sheaves dock and locking the second set of sheave to the sheaves head, and
- retracting the heave compensation cylinder, or heave compensation cylinders, into an active position for providing heave compensation, thus moving the sheaves head away from the sheaves dock.

Thus, in such a method, the heave compensation cylinder, or heave compensation cylinders, are used to move the sheaves inot and out of a docking position, in which docking position the sheaves can be locked to the sheave head or to the sheaves dock.

The invention furthermore provides a method for lowering a gantry of a dual hoist crane, wherein the gantry is configured to be folded into a lowered position, the gantry comprising a back stay with a lower frame section hingeably connected to an upper frame section, the method comprising the steps:

- lowering the boom in a rest position;
- setting a hoisting cable, e.g. the auxiliary hoisting cable, under constant tension, for example by using the heave compensation system or the hoisting winch associated with said hoisting cable, e.g. the auxiliary hoisting winch, to thus load the back stay of the gantry;
- initiating pivoting of the lower frame section of the back stay relative to the upper frame section of the back stay, for example by using an actuator, e.g. a hydraulic cylinder, or a tugging cable;
- paying out the luffing cable to lower the gantry, preferably while keeping constant tension in the hoisting cable, until the gantry is in its lowered position.

By lowering the gantry, the height of the vessel on which the crane is mounted can be reduced, and thus the vessel can pass below lower bridges. It is submitted that the gantry, and the method for lowering that gantry, disclosed herein, can also be used with other cranes, i.e. with single hoist cranes and/or with cranes comprising alternative or no heave compensation systems.

According to a second aspect, the invention furthermore provides a crane with a boom, a luffing installation, and a gantry, wherein the gantry is configured to be lowered by folding part of the gantry frame, more in particular by folding the back stay of the gantry. Thus, the overall height of the crane, in particular the gantry of the crane, can be reduced, which enables passing bridges. Such a gantry is in particular beneficial by large sized boom cranes because for this type of cranes a gantry is extra useful in supporting the boom and luffing cables, but at the same time has as a drawback that it increases the size of the crane which reduces bridge passing capacity of the vessel on which the crane is mounted.

A crane according to the second aspect of the invention comprises a crane structure;

a boom, the boom having an inner end, a midsection and an outer end, which boom is pivotable supported by the crane structure such that it can be pivoted about a substantially horizontal boom axis;

a luffing assembly for pivoting the boom up and down, the luffing assembly comprising:

a luffing winch and an associated luffing cable; and a gantry, the gantry supporting a luffing cable sheave for guiding the luffing cable from the luffing winch to the outer end of the boom;

a main hoisting assembly, for lifting and lowering a load, the main hoisting assembly comprising a main hoisting winch and an associated main hoisting cable, and a mainload suspension device;

wherein the gantry comprises a back stay and a back frame, which back stay and back frame are both at a lower end pivotably mounted to the crane structure, for pivoting about a substantially horizontal back stay pivot axis and back frame pivot axis respectively, and are both at an upper end pivotably connected to each other, wherein the back frame is located between the back stay and the boom, and wherein the backstay comprises a lower frame section and an upper frame section, which lower frame section and upper frame section are pivotably connected, and wherein the gantry can be lowered by pivoting the lower frame section relative to the upper frame section.

In an embodiment, the gantry is provided with actuators for pivoting the lower frame section and the upper frame section of the backstay relative to each other, and thus for lowering and raising the gantry.

In an embodiment, the back stay of the gantry, more in particular the lower frame section of the back stay, and the back frame are both provided with a support structure, which support structures are configured to cooperate to support the back frame when the gantry is in the folded configuration. Providing the gantry with these supports, provides the gantry with a secure and rigid configuration when in the folded configuration.

In the embodiment, the dual hoist heave compensation system is provided in the crane structure, preferably is supported in the crane structure such that the heave compensation cylinder, or heave compensation cylinders, extend in a vertical direction. In a further embodiment, the dual hoist crane is furthermore provided with a foldable gantry, as discussed above, In a further embodiment, the back stay, more in particular the lower frame section of the back stay, is provided with a wire support, which wire support supports the main hoisting wire and the auxiliary hoisting wire when the gantry is in the folded configuration. In a further embodiment, the wire support is configured such that the hoisting wires are led into the dual hoist heave compensation system in a substantially vertical direction, and thus parallel to the cylinders, when the gantry is in the folded configuration.

In a preferred embodiment, the gantry is provided with a heave compensation system according to the first aspect of the invention. In a further embodiment, the gantry is provided with the support frame of the heave motion compensation system, which support frame is mounted in the backstay of the gantry, preferably is mounted in the upper frame section of the back stay, preferably the support frame is an integral part of the back stay.

In an embodiment, the luffing winch is mounted to the crane structure, e.g. is mounted to the gantry, near the back frame pivot axis.

In an embodiment, the gantry is a foldable gantry as discussed herein, and the luffing assembly comprises a luffing cable guide arm supporting the at least one luffing cable sheave, which guide arm preferably pivotably mounted to the back frame, the guide arm comprising the at least one boom side sheave, which luffing cable sheave and boom side sheave are spaced relative to each other, for guiding the luffing cable to the boom and spacing part of the luffing cable at a distance from the back stay.

Preferably, the luffing cable guide arm is provided at a top of the back frame, more in particular at the top of the gantry. Preferably the guide arm is pivotable supported by a guide arm pivot axis, wherein the guide arm pivot axis extends parallel to the boom pivot axis.

In a further embodiment, the guide arm is a triangular construction, when seen in a direction parallel to the pivot axis. In such an embodiment, the triangular construction is pivotable supported at its top, and the base of the triangular construction supports the at least one boom side sheave at one end, and the base of the triangular supports at least one gantry side sheave at an opposite end, the at least one luffing cable being guided from the crane structure over the at least one boom side sheave and over the at least one boom side sheave to the boom.

The luffing cable guide arm is configured to position the at least one boom side sheave away from the gantry, more in particular away form the back frame of the gantry, when the gantry is in the folded configuration. The luffing cable guide arm is configured such that, when the gantry is in the folded configuration, the at least one luffing cable does not extend from the top of the gantry to the boom, but from a position above the top of the gantry to the boom. Thus, the guide arm provides the at least luffing cable with an improved angle relative to the boom, when the boom is to be lifted out of a lowered position. This is in particular beneficial when the boom is to be lifted out of a lowered storage position.

Whilst primarily presented for illustrative purposes with reference to one or more of the figures, any of the technical features addressed below may be combined with any of the independent claims of this application either alone or in any other technically possible combination with one or more other technical features.

Advantageous embodiments of the dual hoist crane and the dual hoist heave motion compensation system according to the invention and the method according to the invention are disclosed in the sub claims and in the description, in which the invention is further illustrated and elucidated on the basis of a number of exemplary embodiments, of which some are shown in the schematic drawing. In the figures, components corresponding in terms or construction and/or function are provided with the same last two digits of the reference numbers.

Figure 1:
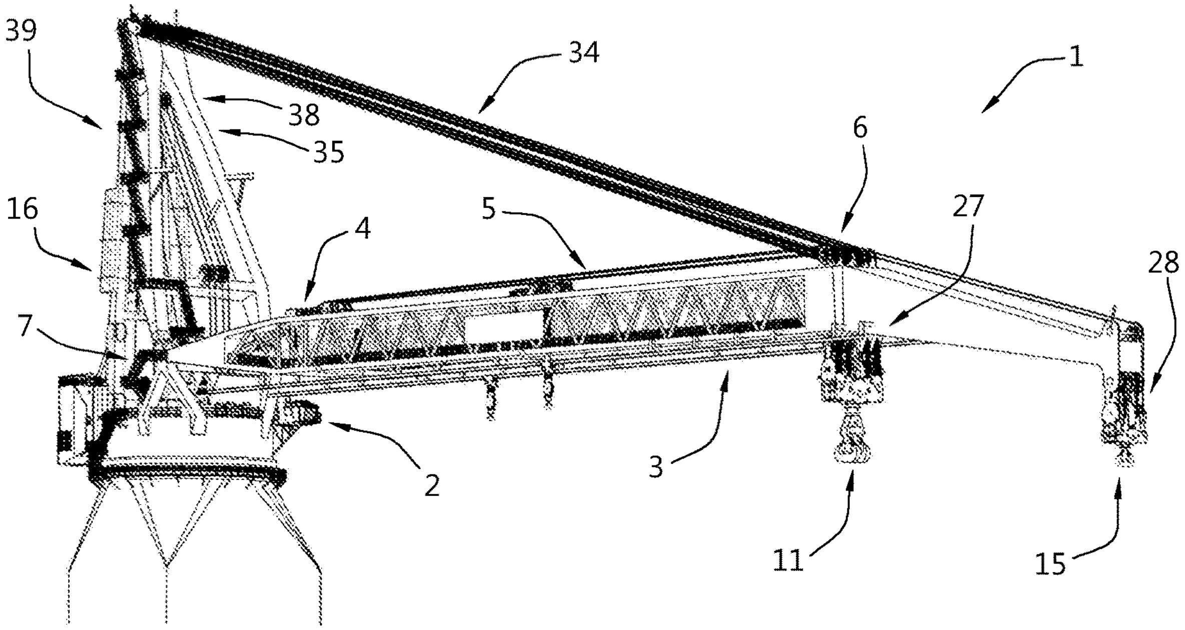
FIG. 1 shows perspective three quarter frontal view of a dual hoist crane according to the claimed invention.
Figure 2:
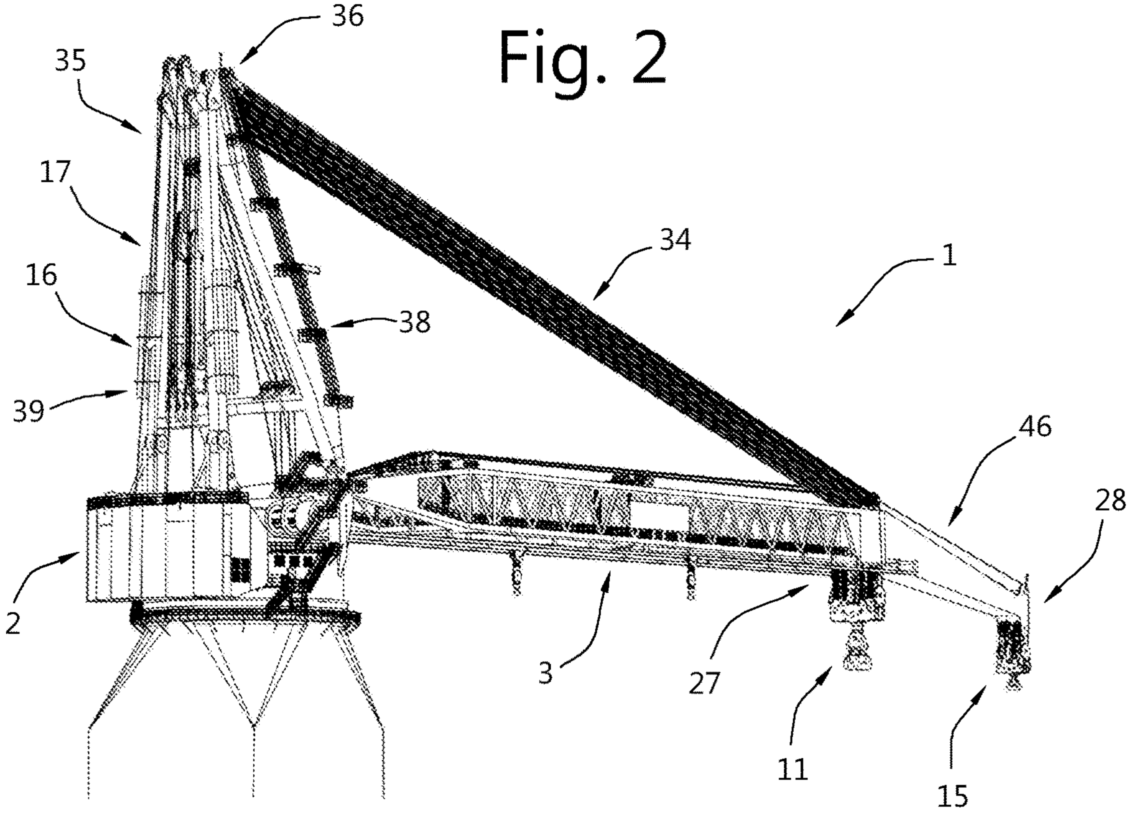
FIG. 2 shows a perspective three quarter rear view of the dual hoist crane of FIG. 1.

FIG. 1 shows a perspective view of a dual hoist crane 1 according to the invention. The dual hoist crane 1 comprises a crane structure 2 and a boom 3.

The boom 3 has an inner end 4, a midsection 5, and an outer end 6. The boom 3 is pivotable supported by the crane structure 2 such that it can be pivoted about a substantially horizontal boom axis 7.

The dual hoist crane 1 further comprises a main hoisting assembly 8, for lifting and lowering a load, and an auxiliary hoisting assembly 12 for lifting and lowering a load.

The main hoisting assembly 8 comprises a main hoisting winch 9 and an associated main hoisting cable 10, and a main load suspension device 11.

The auxiliary hoisting assembly 12 comprises an auxiliary hoisting winch 13, an associated auxiliary hoisting cable 14, and an auxiliary load suspension device 15.

In the embodiment shown, the dual hoist crane further comprises a luffing assembly 32 for pivoting the boom 3 up and down. The luffing assembly comprises a luffing winch 33 and an associated luffing cable 34. The luffing assembly 32 further comprises a gantry 35. The gantry supports a luffing cable sheave 36 for guiding the luffing cable 34 from the luffing winch 33 to the outer end 6 of the boom 3.

It is noted that the luffing cable 34 is looped multiple times between the outer end 6 of the boom 3 and the gantry 35, to thus enable the luffing cable 34 to support the weight of the boom 3, and potentially the weight of a load supported by the dual hoist crane 1.

Furthermore, in the embodiment shown, the boom 3 is provided with a jib 46, mounted at the outer end 6 of the boom 3. The main hoisting cable 10 is supported at the outer end of the boom 3 and the auxiliary hoisting cable 14 is supported at an outer end of the jib 46.

According to the claimed invention, the dual hoist crane 1 further comprises a dual hoist heave motion compensation system 16. The heave motion compensation system 16 comprises a support frame 17, two heave compensation cylinders 18, which heave compensation cylinders are each provided with a sheave head 22, a sheave dock 24, a first set of sheaves 25 and a second set of sheaves 26.

In the embodiment shown, the support frame 17 is part of a gantry 35 of the dual hoist crane 1. The support frame 17, more in particular the gantry 35, supports the two heave compensation cylinders 18.

Each of the heave compensation cylinders 18 has a cylinder body 19 and a cylinder rod 20. The heave compensation cylinders are mounted parallel in the support frame of the heave compensation assembly, in the embodiment shown are mounted in the gantry of the dual hoist crane. Furthermore, both cylinders 18 are mounted with their cylinder bodies 19 at the top, the cylinders rods 20 extending in a downward direction.

The heave compensation cylinders are both connected to a gas buffer 21 to enable passive heave compensation. In the embodiment shown, the gas buffers are also mounted to the support frame 17, in the embodiment shown the gantry 35.

The sheave heads 22 are supported by the cylinder rods 20, for movement along a heave compensation trajectory 23. The heave compensation trajectory runs parallel to the heave compensation cylinders 18, between the lower end of the cylinder bodies 19 and the sheave dock 24.

According to the claimed invention, the sheave dock is mounted on the support frame of the heave compensation assembly, at an end of the heave compensation trajectory. In the embodiment shown, the gantry of the dual hoist crane forms the heave compensation frame. Thus, in the embodiment shown, the sheave dock 24 is a cross beam that is also part of the gantry 35.

The first set of sheaves 25 guides the main hoisting cable 10 of the main hoisting assembly 8, while the second set of sheaves 26 guides the auxiliary hoisting cable 14 of the auxiliary hoisting assembly 12.

The main hoisting cable 10 extends from the main hoisting winch 9 along the heave compensation trajectory 23, via the first set of sheaves 25, and via at least one main hoisting sheave 27 at the outer end 6 of the boom 3 to the main load suspension device 11.

The auxiliary hoisting cable 14 extends from the auxiliary hoisting winch 13 along the heave compensation trajectory 23, via the second set of sheaves 26, and via at least one auxiliary hoisting sheave 28 at the outer end 6 of the boom 3, in the embodiment shown at an outer end of a jib 46, to the auxiliary load suspension device 15.

According to the claimed invention, the dual hoist heave motion compensation system 16 is configured to individually lock the first set of sheaves 25 and the second set of sheaves 26 to the sheave head 22, for respectively providing the main hoisting assembly 8 and the auxiliary hoisting assembly 12 with heave compensation.

The dual hoist heave motion compensation system 16 is further configured to individually lock the first set of sheaves 25 and the second set of sheaves 26 to the sheave dock 24, for respectively not providing the main hoisting assembly 8 and the auxiliary hoisting assembly 12 with heave compensation.

The dual hoist heave motion compensation system 16 thus enables for providing only the main hoisting assembly 8 with heave compensation and for providing only the auxiliary hoisting assembly 12 with heave compensation.

In the embodiment shown, both the main hoisting cable 10 and the auxiliary hoisting cable 14 are looped multiple times around the heave compensation cylinders 18, and thus are looped multiple times along the heave compensation trajectory 23. Thus, the heave compensation cylinders 18 can provide heave compensation with a minimal stroke of the cylinder rods. This allows for a compact configuration of the heave compensation system.

Furthermore, in the embodiment shown, for each heave compensation cylinder, the second set of sheaves 26, guiding the auxiliary hoisting cable 14, is subdivided into two subsets 47, which subsets are provided on opposite sides of the first set of sheaves 25, guiding the main hosting cable 10.

The number of sheaves of second set 26 is even. The sheaves of that set are divided into two subsets 47, each subset comprising the same number of sheaves. Furthermore, each of the subsets 47 has a sheave head locking position 48 and a sheave dock locking position 49, in which they are locked to the sheave head 22 and to the sheave dock 24 respectively.

The sheaves of the first set 25 also have a sheave head locking position 48 and a sheave dock locking position 49, in which they are locked to the sheave head 22 and to the sheave dock 24 respectively.

Figure 3:
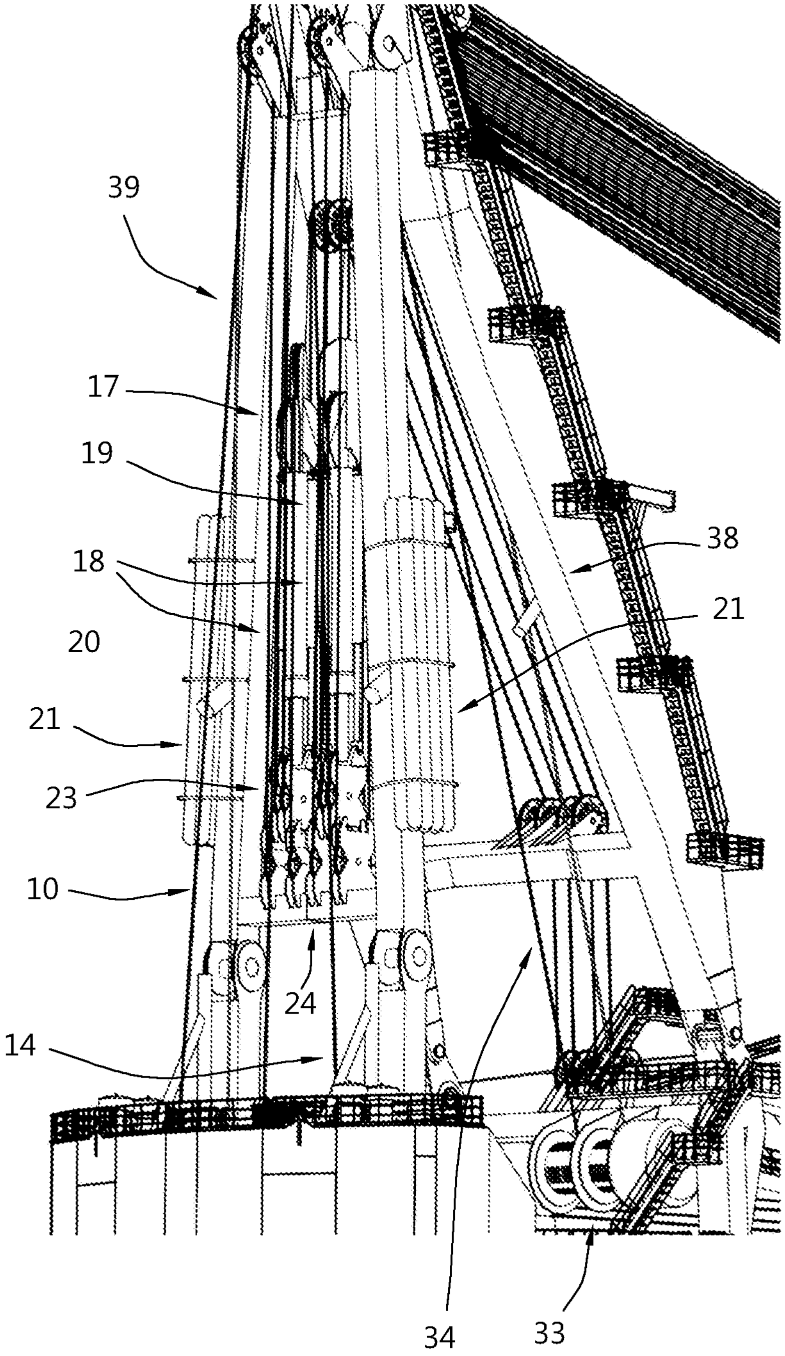
FIG. 3 shows an enlarged view of a section of the dual hoist crane of FIG. 1.
Figure 4:
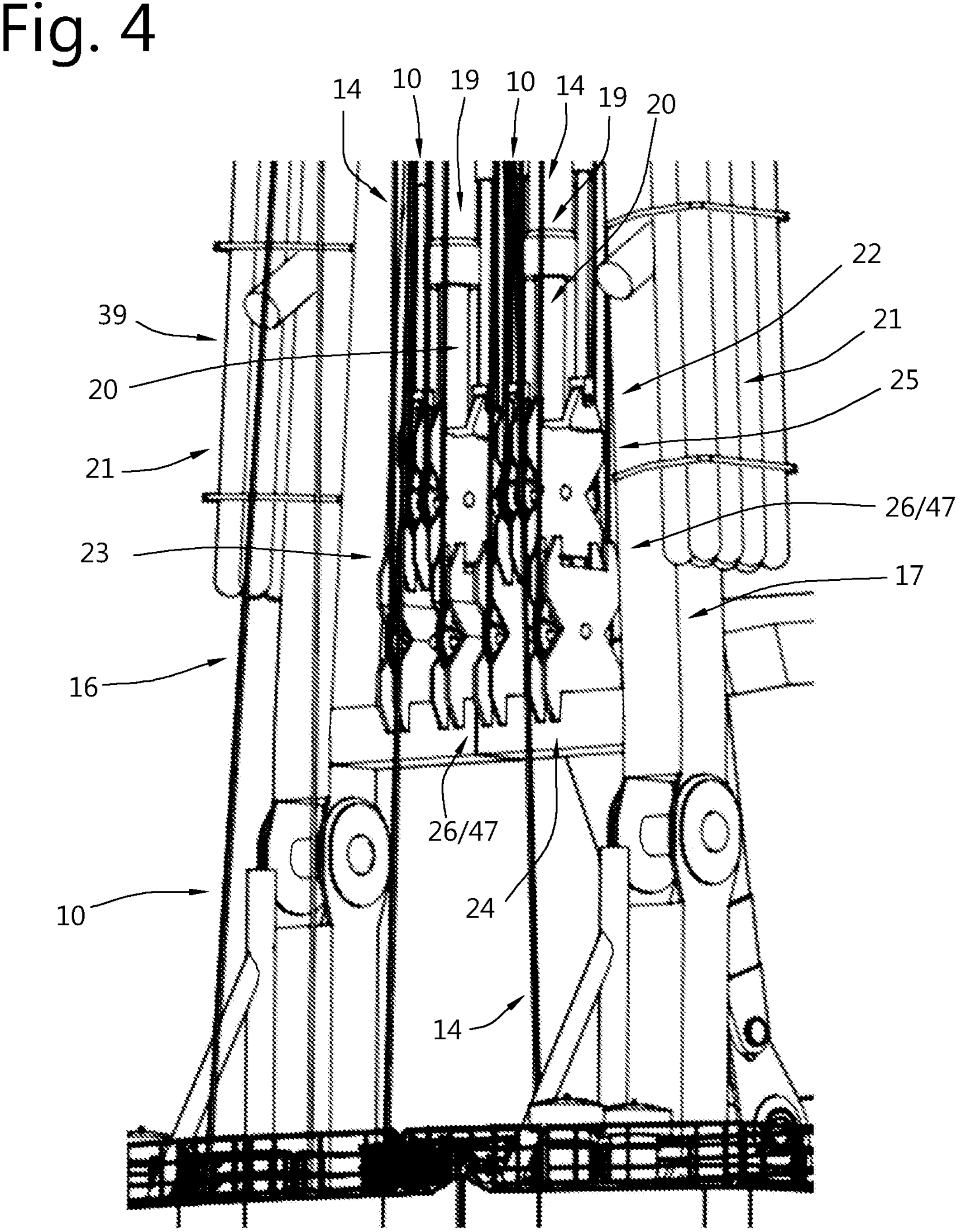
FIG. 4 shows a further enlarged view of a section of the dual hoist crane of FIG. 1.
Figure 5:
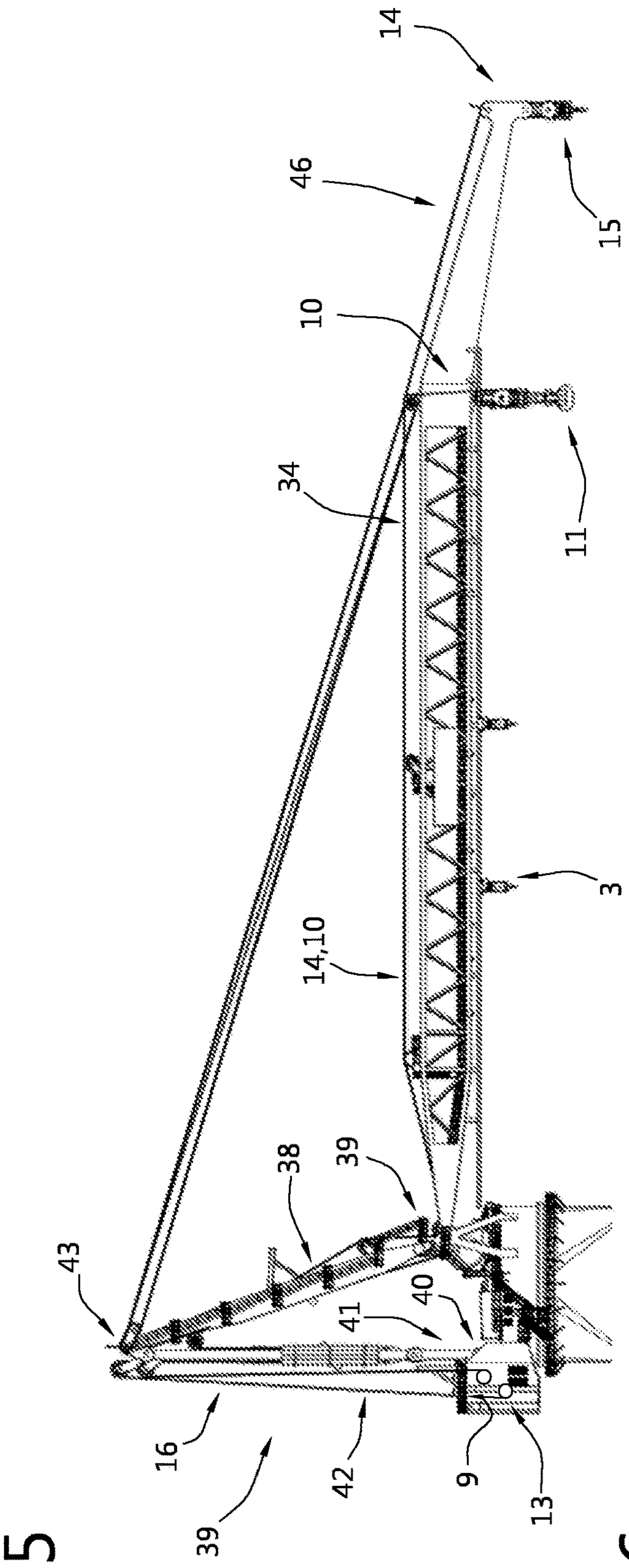
FIG. 5 shows a side view of the dual hoist crane of FIG. 1 with a raised gantry.
Figure 6:
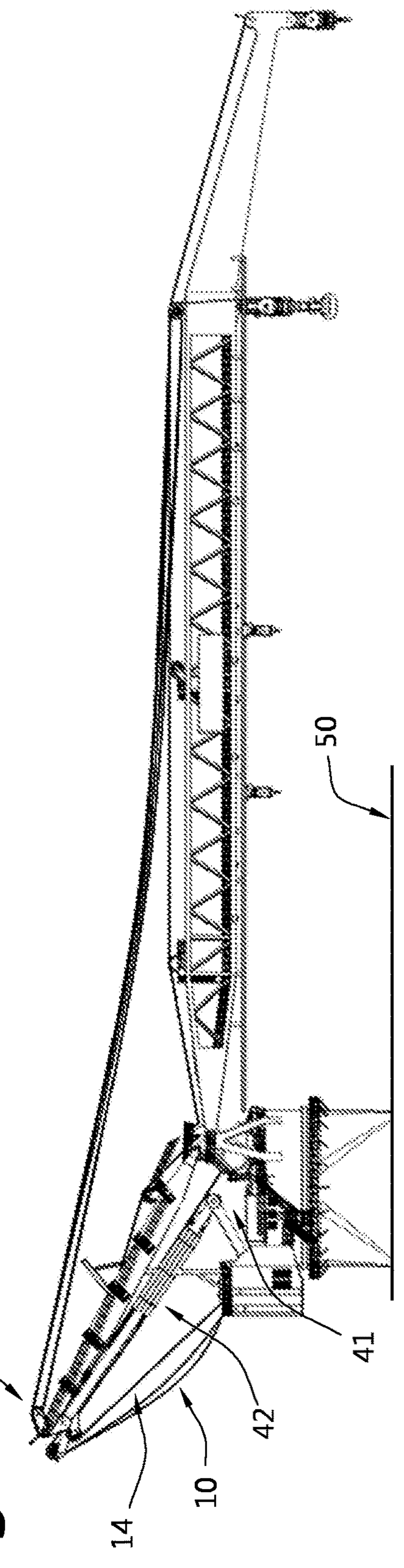
FIG. 6 shows a side view of the dual hoist crane of FIG. 1 with a lowered gantry.

In FIG. 3 and FIG. 4, the subsets 47 of the second set of sheaves 26 are in the sheave dock locking position 49, while the first set of sheaves 25 are in the sheave head locking position 48.

The locking positions of the subsets 47 are spaced relative to each other. The sheave head locking position 48 and the sheave dock locking position 49 of the first set of sheaves 25 are located between the sheave head locking position 48 and the sheave dock locking position 49 of the subsets 47.

In the embodiment shown, the sheaves of the first set of sheaves 25 and the sheaves of the second set of sheaves 26 are configured to be locked to the sheave head 22, more in particular are configured to be bolted to the sheave head, and to be locked to the sheave dock 24, more in particular are configured to be bolted to the sheave dock 24.

In an alternative embodiment, the sheaves of the first set and the sheaves of the second set are mounted in a first sheave block and a second sheave block respectively, and wherein the first sheave block and the second sheave block are configured to be mounted to the sheave head and to be mounted to the sheave dock, to lock the sheaves to the sheave head and to lock the sheaves to the sheave dock respectively.

In the embodiment shown, the dual hoist crane therefore comprises locking devices for locking the sheaves, or alternatively the sheave blocks in which the sheaves are mounted, to the sheave head and the sheave dock. In the embodiment shown, the locking devices comprise the nuts and bolts for locking the sheaves to the sheave head and the sheave dock, and the apertures in the sheaves, more in particular the sheave holders, the sheave head and the sheave dock for receiving the bolts.

The dual hoist crane 1 depicted in FIG. 1 enables a method for hoisting a load according to the invention. The method comprising the steps:

locking the first set of sheaves 25 to the sheave head 22 and locking the second set of sheaves 26 to the sheave dock 24, as shown in FIG. 3 and FIG. 4, and hoisting a load with the main hoisting assembly 8 while providing the main hoisting cable 10 with heave motion compensation using the heave motion compensation system 16, and/or locking the second set of sheaves 26 to the sheave head 22 and locking the first set 25 of sheaves to the sheaves dock 24, and hoisting a load with the auxiliary hoisting assembly 12 while providing the auxiliary hoisting cable 14 with heave motion compensation using the heave motion compensation system 16.

In the embodiment shown, the dual hoist crane 1 comprises a tugging track 44. The which tugging track 44 is mounted to the boom 3 and extends along the boom, for guiding a tug-trolley 45 along the length of the boom 3. The tug trolley 45 is configured to support cables, e.g. is provided with winches, to be linked to a load supported by the main hoisting assembly 8 or the auxiliary hoisting assembly 12, to reduce swing of said load, and preferably position the load relative to the boom.

In the embodiment shown, the main hoisting winch 9 and the auxiliary hoisting winch 13 are fixed to the crane structure 2 at the back of the crane 1 and below the gantry 35. In the preferred embodiment shown, the main hoisting cable and the auxiliary hoisting cable extend from their respective winches to the top of the gantry 35, are looped multiple times in the heave compensation system, are guided via the top of the gantry to the base of the boom, and run along the boom to the far end of the boom and the jib.

In the preferred embodiment shown, the dual hoist crane 1 is mounted on a vessel 50.

Figure 7:
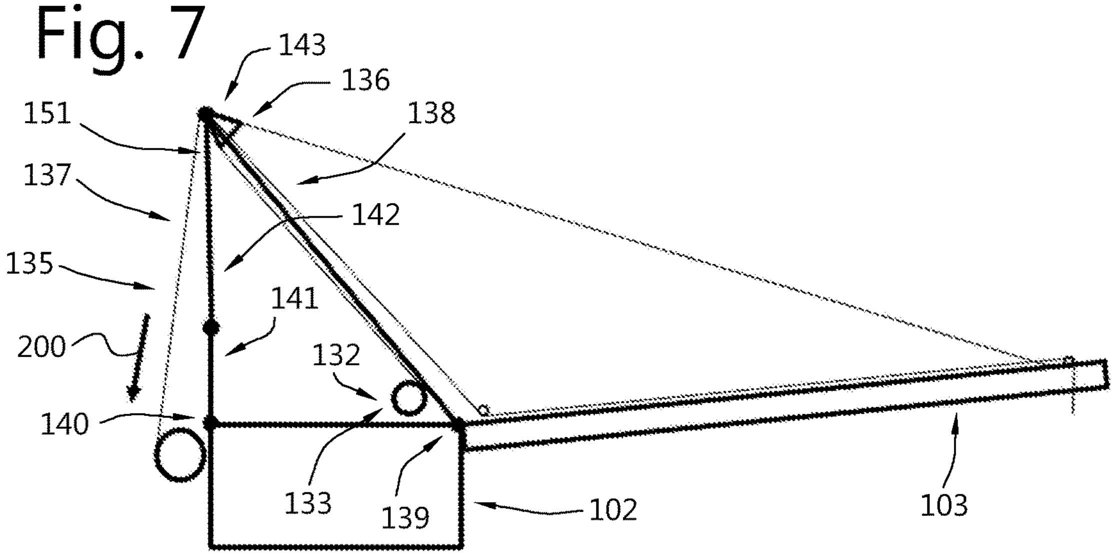
FIG. 7 shows a schematic drawing of a dual hoist crane according to the invention, with a gantry in a raised position.
Figure 8:
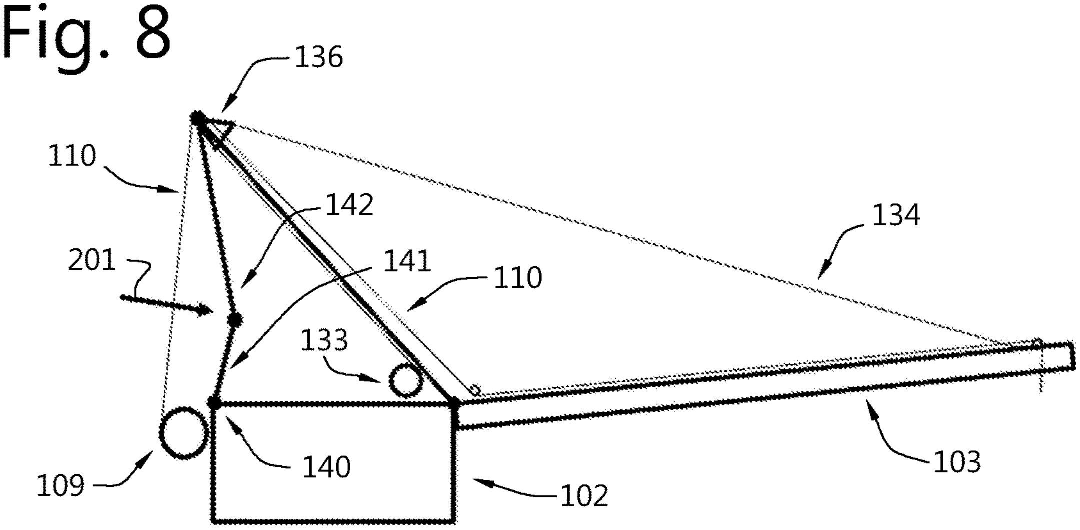
FIG. 8 shows a schematic drawing of a dual hoist crane according to the invention, with a gantry in an intermediate position.
Figure 9:
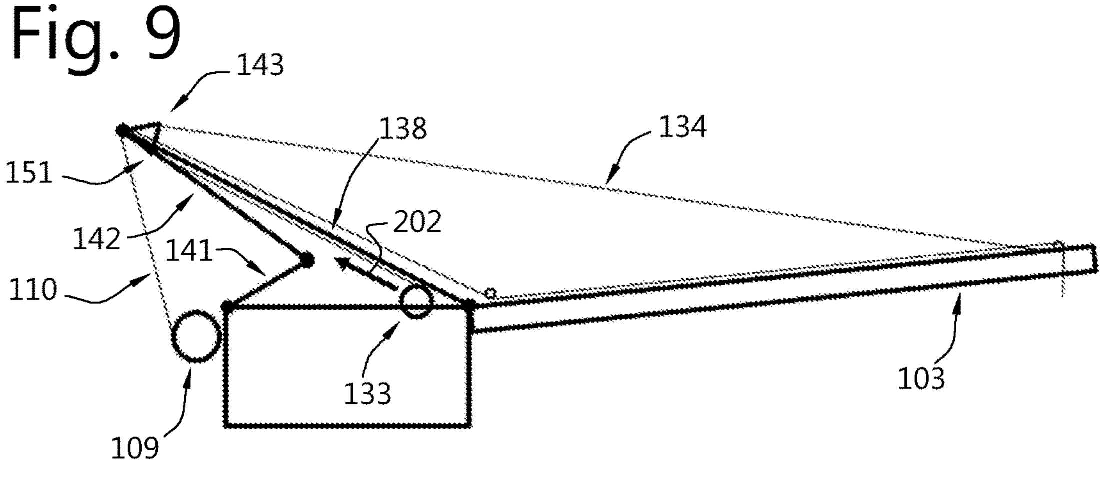
FIG. 9 shows a schematic drawing of a dual hoist crane according to the invention, with a gantry in a lowered position.

FIGS. 7-9 show simplified schematic drawings of a dual hoist crane 101 comprising a luffing assembly 132 and a gantry 135. The figures depict subsequent steps in the lowering of the gantry, which process will be explained below.

The gantry 135 comprises a back stay 137 and a back frame 138, which back stay and back frame are both at a lower end pivotably mounted to the crane structure 102, for pivoting about a substantially horizontal back stay pivot axis 140 and back frame pivot axis 139 respectively, and are both at an upper end pivotably connected to each other. in the embodiment the back frame and the back stay are directly coupled to each other, in an alternative embodiment, they may be coupled via an intermediate body.

The back frame 138 is located between the back stay 137 and the boom 103. The backstay 137 comprises a lower frame section 141 and an upper frame section 142, which lower frame section and upper frame section are pivotably connected to each other. The gantry 135 can be lowered by pivoting the lower frame section relative to the upper frame section. The lowered position of the gantry 135 is depicted in FIG. 9.

In the embodiment shown, the luffing winch 133 is mounted to the gantry 135, near the back frame pivot axis 140.

In a preferred embodiment, the support frame of the heave motion compensation system is mounted in the backstay of the gantry, preferably is mounted in the upper frame section of the back stay, preferably the support frame is an integral part of the back stay.

To lower the height of the vessel, the gantry 135 can be lowered. The invention furthermore provides a method for lowering the gantry 135, said method comprising the steps set out below. It is submitted that the gantry, and the associated method, can be used with a dual hoist crane provided with a heave compensation system according to the invention, but can also be used with a single hoist crane, and/or with crane without the heave compensation system.

To lower the gantry, first, the boom is lowered into a rest position. This preferably also includes securing the load suspension device of the hoisting assembly, or hoisting assemblies, in a parking position adjacent the boom.

Subsequently, the hoisting cable 10 is set under constant tension. In the embodiment only a single hoisting assembly is depicted, but the crane can be provided with an auxiliary hoisting assembly as well. This can be done by using the heave compensation system, if present, or by using the associated hoisting winch 109. The hoisting winch is set under constant tension to thus load the back stay of the gantry. This step is depicted in FIG. 7, with an arrow 201 indicating the tensioning of the hoisting cable 110.

Subsequently, pivoting of the lower frame section 141 of the back stay 137 relative to the upper frame section 142 of the back stay 137 is initiated. This is depicted in FIG. 8, arrow 202 indicating the initiated hinging. This initiating can be done by way of an actuator e.g. a hydraulic cylinder mounted in the back stay, or for example by pulling at the hinge point using a tugging cable.

Once the hinging of the back stay has been initiated, the gantry is prevented from hinging into the lowered position by the luffing cable. Therefore, paying out the luffing cable, preferably while keeping constant tension in the hoisting cable, causes the gantry to be lowered in a controlled manner. Thus, by paying out the luffing cable the gantry is lowered into its lowered position, depicted in FIG. 9, in which arrow 202 indicates the pay out of the luffing cable.

The embodiment depicted in FIGS. 7-9 also shows a schematic depiction of a luffing cable guide arm 143, which guide arm 43 is also depicted, in more detail, in the FIGS. 1-6, of the luffing assembly.

In an embodiment, the luffing assembly 132 comprises a luffing cable guide arm 143 supporting the at least one luffing cable sheave 136. The guide arm 143 is pivotably mounted to the gantry 135, preferably the back frame 138 of the gantry. The guide arm comprises at least one boom side sheave 151, which is paced, by the arm, relative to luffing cable sheave 136. The purpose of the luffing cable guide arm is to guide the luffing cable to the boom while spacing part of the luffing cable at a distance from the back stay. Thus, the angle between luffing cable and gantry is optimal for lifting the boom, and for pulling the gantry into a lifted position.

Figure 10:
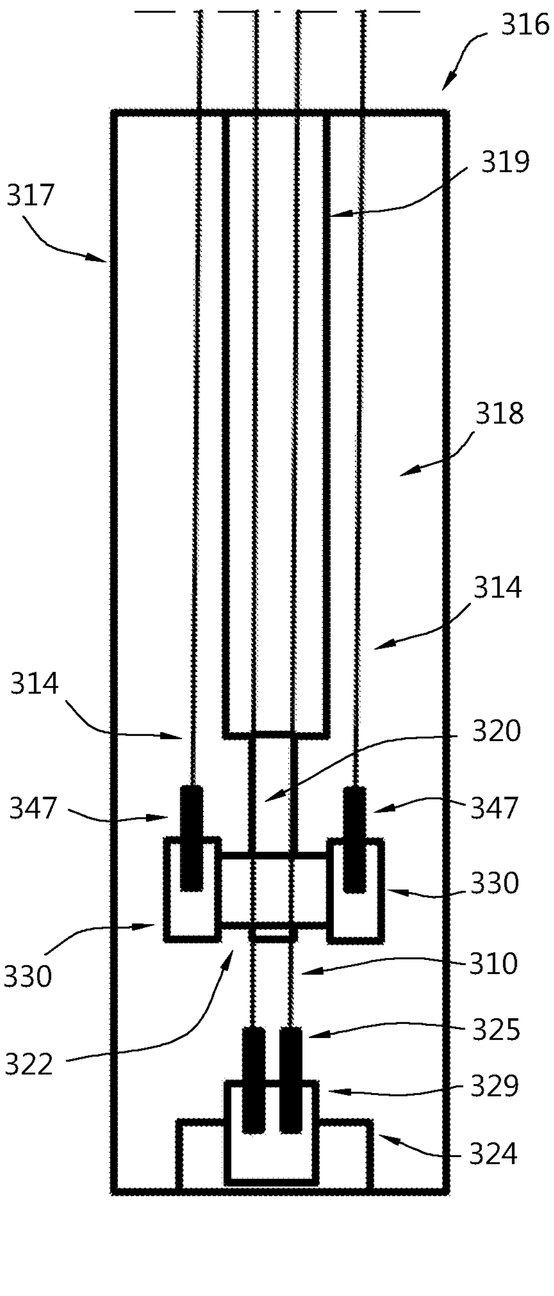
FIG. 10 shows a schematic drawing of a heave compensation system according to the invention in a first condition.
Figure 11:
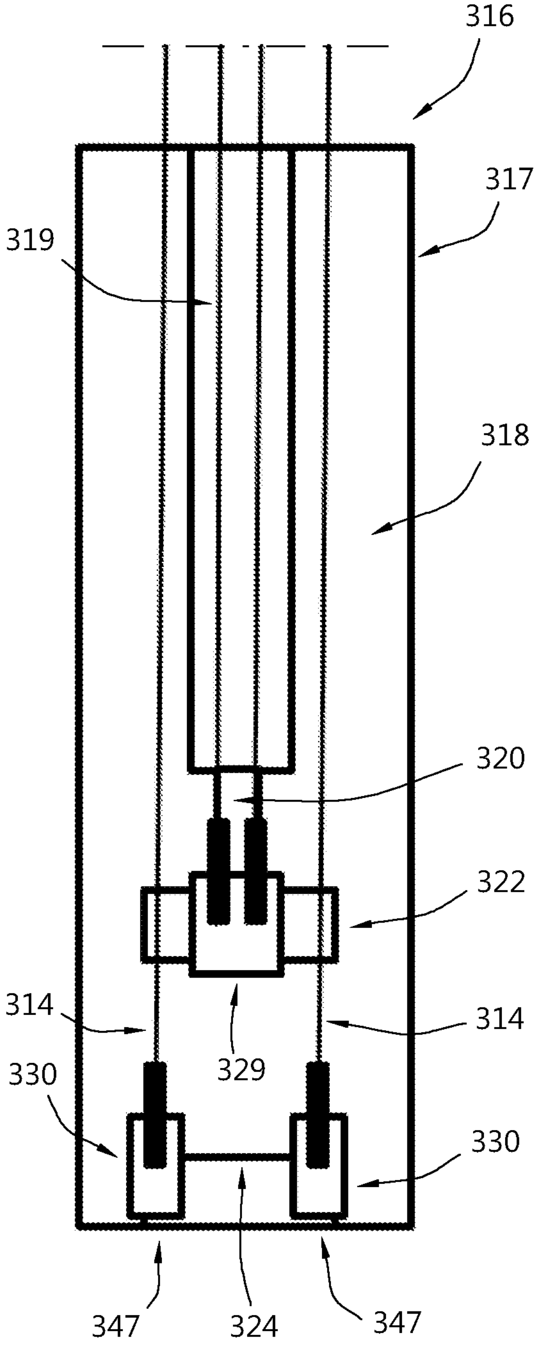
FIG. 11 shows a schematic drawing of a heave compensation system according to the invention in a second condition.

FIGS. 10 and 11 depict a schematic representation of an embodiment of a dual hoist heave compensation system 316 according to the invention. FIG. 20 depicts the heave compensation system 316 configured for providing heave to the main hoisting assembly, while FIG. 11 depicts the heave compensation system 316 configured for providing heave to the auxiliary hoisting assembly.

Depicted are the heave compensation cylinder 318, comprising a cylinder body 319 and a cylinder rod 320, which cylinder is mounted in a support frame 317.

In the embodiment shown, a first set of sheaves 325, mounted in a first sheave block 329, guides a main hoisting cable 310. A second set of sheaves 326, guiding an auxiliary hoisting cable 314, comprises to subsets 347, each mount in a second sheave block 330.

In FIG. 10, the first sheave block 329 is locked to the sheave dock 324, while the second sheave blocks 330 are locked to the sheave head 322 supported by the heave compensation cylinder 318. Thus, the heave compensation cylinder 318 allows the first set of sheaves 325 to move along the heave compensation trajectory 323, and thus provide the main hoisting assembly with heave compensation.

In FIG. 11, the first sheave block 329 is locked to the sheave head 322, while the second sheave blocks 330 are locked to the sheave block 324. Thus, the heave compensation cylinder 318 allows the second set of sheaves 326, more in particular the subsets 347 of the second set of sheaves, to move along the heave compensation trajectory 323, and thus provide the auxiliary hoisting assembly with heave compensation.

Figure 12:
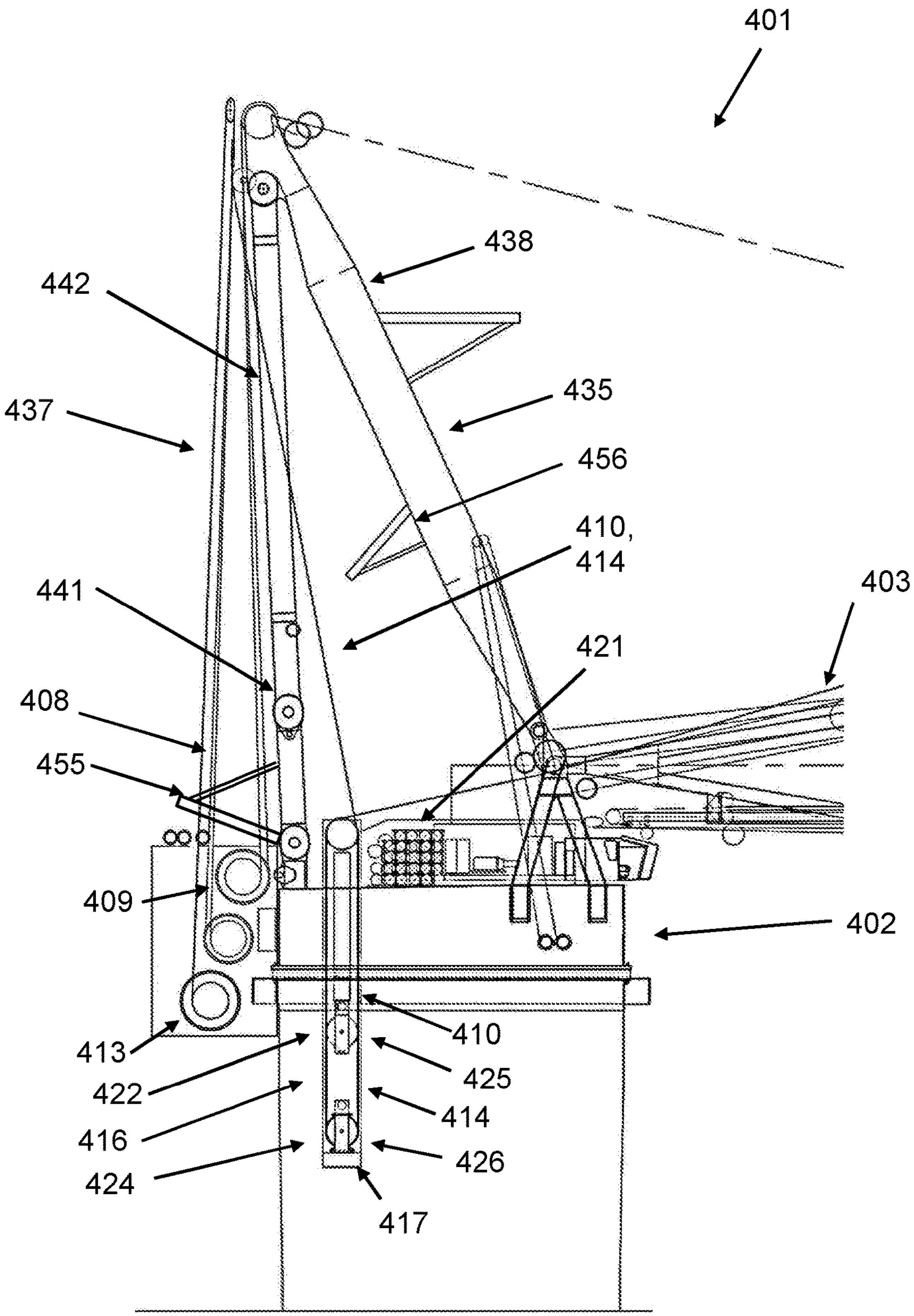
FIG. 12 shows a partial side view, in partial cross section, of a dual hoist crane according to the invention.
Figure 13:
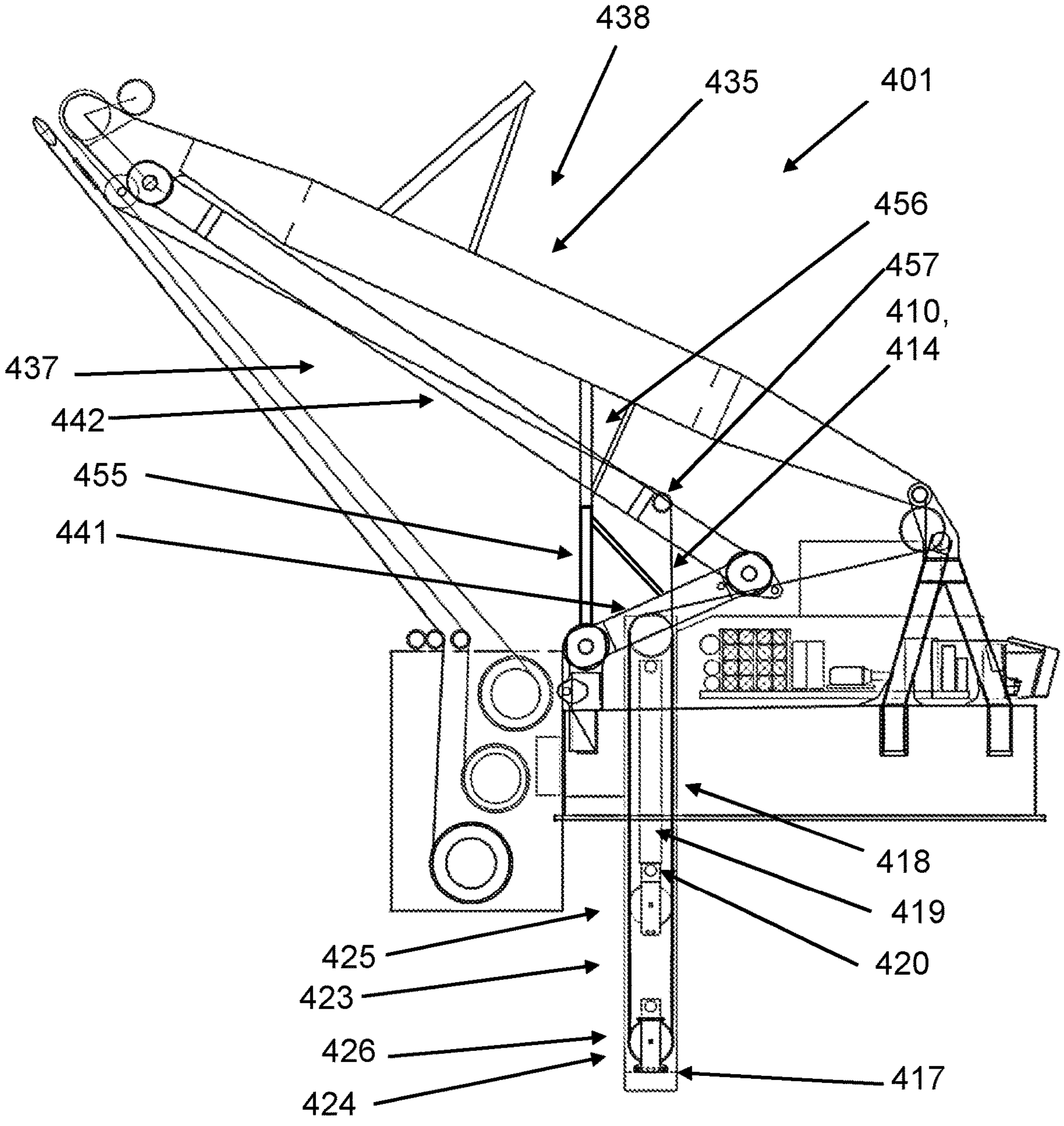
FIG. 13 a partial side view, in partial cross section, of the dual hoist crane of FIG. 12 in an alternative configuration.

FIG. 12 shows a partial side view, in partial cross section, of a dual hoist crane 401 according to the invention. FIG. 13 shows the same crane, in a different configuration. Both figures provide a schematic view of the crane, wherein not all components are depicted and some are depicted in see through. The main purpose of the figures is to show an alternative mounting location of the dual hoist heave compensation system 416.

The dual hoist crane 401 is similar to the dual hoist crane 1 shown in FIG. 1. Both cranes are provided with a dual hoist heave compensation system 16; 416 according to the invention.

The main differences between these two cranes is that with the dual hoist crane 401 shown in FIG. 12 the dual hoist heave compensation system 416 is not mounted in the gantry 435 of the crane. Instead, the dual hoist heave compensation system 416 is mounted in the crane structure 402 of the crane 401. Thus, in this embodiment of a dual hoist crane according to the invention, the mass of the dual hoist heave compensation system is mounted lower in the crane. Therefore, the center of gravity of the crane, and of the vessel, is relatively low, which is beneficial for the dynamic behavior of the vessel. This is in particular the case when the vessel is travelling between job sites and when the boom of the crane is in the lowered position.

The dual hoist crane 401 comprises a crane structure 402 and a boom 403. The boom 403 is pivotable supported by the crane structure 402 such that it can be pivoted about a substantially horizontal boom axis.

The dual hoist crane 401 further comprises a main hoisting assembly 408, for lifting and lowering a main load, and an auxiliary hoisting assembly 412 for lifting and lowering an auxiliary load.

The main hoisting assembly 408 comprises a main hoisting winch 409 and an associated main hoisting cable 410, and a main load suspension device.

The auxiliary hoisting assembly 412 comprises an auxiliary hoisting winch 413, an associated auxiliary hoisting cable 414, and an auxiliary load suspension device.

Both the main hosting cable and the auxiliary hoisting cable are guided via the dual hoist heave motion compensation system 416.

Similar to the dual hoist heave compensation system shown in FIG. 3, the system comprises a support frame, two heave compensation cylinders 418, which heave compensation cylinders are each provided with a sheave head 422, a sheave dock 424, a first set of sheaves 425 and a second set of sheaves 426.

Similar to the dual hoist heave compensation system shown in FIG. 3, the system comprises a support frame, two heave compensation cylinders 418, which heave compensation cylinders are each provided with a sheave head 422, a sheave dock 424, a first set of sheaves 425 and a second set of sheaves 426.

It is to be noted that the dual hoist heave compensation system 416 is shown in a side view, and that not all components are depicted in the drawing. Furthermore, the heave compensation cylinders 418 are depicted in the retracted position, supporting a first set of sheaves 425. The second set of sheaves 426 is depicted mounted to the sheave dock 424.

In the embodiment shown, the support frame 417 is mounted in the crane structure 402 of the dual hoist crane 1.

In the embodiment shown, the crane structure 402 is, via a slew bearing, rotatable supported on a pedestal. The support frame 417 of the dual hoist heave compensation system 416, which supports the two heave compensation cylinders 418, is supported by the crane structure 402, and extends through the slew bearing into the pedestal supporting the dual hoist crane 401. Thus, when the crane 401 is rotated, the dual hoist heave compensation system 416, or at least a part therefore, moves through the pedestal of the dual hoist crane.

Each of the heave compensation cylinders 418 has a cylinder body 419 and a cylinder rod 420. The heave compensation cylinders are mounted parallel in the support frame of the heave compensation assembly. Furthermore, both cylinders 418 are mounted with their cylinder bodies 419 at the top, the cylinders rods 420 extending in a downward direction.

The heave compensation cylinders 418 are both connected to a gas buffer 21 to enable passive heave compensation. In the embodiment shown, the gas buffers are also mounted to the crane structure 402.

The sheave heads 422 are supported by the cylinder rods 420, for movement along a heave compensation trajectory 423. The heave compensation trajectory runs parallel to the heave compensation cylinders 418, between the lower end of the cylinder bodies 419 and the sheave dock 424.

According to the claimed invention, the sheave dock is mounted on the support frame of the heave compensation assembly, at an end of the heave compensation trajectory.

The main hoisting cable 410 extends from the main hoisting winch 409 along the heave compensation trajectory 423, via the first set of sheaves 425, and via at least one main hoisting sheave at the outer end of the boom to the main load suspension device.

The auxiliary hoisting cable 414 extends from the auxiliary hoisting winch 413 along the heave compensation trajectory 423, via the second set of sheaves 426, and via at least one auxiliary hoisting sheave at the outer end of the boom, to the auxiliary load suspension device.

According to the claimed invention, the dual hoist heave motion compensation system 416 is configured to individually lock the first set of sheaves 425 and the second set of sheaves 426 to the sheave head 422, for respectively providing the main hoisting assembly and the auxiliary hoisting assembly with heave compensation.

The dual hoist heave motion compensation system 416 is further configured to individually lock the first set of sheaves 425 and the second set of sheaves 426 to the sheave dock 424, for respectively not providing the main hoisting assembly and the auxiliary hoisting assembly with heave compensation.

The dual hoist heave motion compensation system 16 thus enables for providing only the main hoisting assembly with heave compensation and for providing only the auxiliary hoisting assembly with heave compensation.

Similar to the embodiments depicted in the preceding figures, the dual hoist crane 401 depicted in FIG. 12 and FIG. 13 comprises a gantry 435 comprising a back stay 437 and a back frame 438. The back stay and back frame are both at a lower end pivotably mounted to the crane structure 402, for pivoting about a substantially horizontal back stay pivot axis 440 and back frame pivot axis 439 respectively, and are both at an upper end pivotably connected to each other.

The back frame 438 is located between the back stay 437 and the boom 403. The backstay 437 comprises a lower frame section 441 and an upper frame section 442, which lower frame section and upper frame section are pivotably connected to each other. The gantry 135 can be lowered by pivoting the lower frame section relative to the upper frame section. The lowered position of the gantry 435 is depicted in FIG. 13.

In the embodiment shown, the back stay 437, more in particular the lower frame section 441 of the back stay 437, is provided with a support structure 455, which support structure 455 cooperates with a support structure 456 provided on the back frame 435 to support the back frame when the gantry 435 is in the folded configuration. Providing the gantry with these supports, provides the gantry with a secure and rigid configuration when in the folded configuration.

Also, in the embodiment shown, the back stay 437, more in particular the lower frame section 441 of the back stay 437, is provided with a wire support 457, which wire support 457 supports the main hoisting wire 410 and the auxiliary hoisting wire 414 when the gantry 435 is in the folded configuration. In the embodiment shown, the wire support is configured such that the hoisting wires are led into the dual hoist heave compensation system 416 in a substantially vertical direction, and thus parallel to the cylinders 418, when the gantry 435 is in the folded configuration.

REFERENCE SIGNS

01 dual hoist crane
02 crane structure;
03 boom
04 inner end boom
05 midsection boom
06 outer end boom
07 horizontal boom axis;
08 main hoisting assembly
09 main hoisting winch
10 main hoisting cable
11 main load suspension device
12 auxiliary hoisting assembly
13 auxiliary hoisting winch
14 auxiliary hoisting cable
15 auxiliary load suspension device
16 dual hoist heave motion compensation system
17 support frame dual hoist heave motion compensation system
18 heave compensation cylinder
19 cylinder body heave compensation cylinder
20 cylinder rod heave compensation cylinder
21 gas buffer
22 sheave head
23 heave compensation trajectory;
24 sheave dock
25 first set of sheaves
26 second set of sheaves
27 main hoisting sheave
28 auxiliary hoisting sheave
29 first sheave block
30 second sheave block
31 locking devices for locking the sheaves or the sheave blocks
32 luffing assembly
33 luffing winch
34 luffing cable
35 gantry
36 luffing cable sheave
37 back stay gantry
38 back frame gantry
39 substantially horizontal back frame pivot axis
40 substantially horizontal back stay pivot axis
41 lower frame section back stay
42 upper frame section back stay
43 luffing cable guide arm
44 tugging track
45 tug-trolley
46 jib
47 subsets of sheaves
48 sheave head locking position
49 sheave dock locking position
50 vessel
51 boom side luffing sheave
55 support structure

56 support structure

57 wire support

The invention claimed is:

1. A dual hoist heave compensation system for use in a dual hoist crane, the heave compensation system comprising:

a support frame;

a heave compensation cylinder, having a cylinder body mounted on the support frame and a cylinder rod, the heave compensation cylinder being configured to be connected to a gas buffer to enable passive heave compensation;

a sheave head, wherein the sheave head is supported by the cylinder rod for movement along a heave compensation trajectory;

a sheave dock, mounted on the support frame at an end of the heave compensation trajectory;

a first set of sheaves for guiding a main hoisting cable of a main hoisting assembly; and a second set of sheaves for guiding an auxiliary hoisting cable of an auxiliary hoisting assembly, wherein the dual hoist heave motion compensation system is configured to individually lock the first set of sheaves and the second set of sheaves to the sheave head, for respectively providing a main hoisting assembly and an auxiliary hoisting assembly with heave compensation, and to individually lock the first set of sheaves and the second set of sheaves to the sheave dock, for respectively not providing the main hoisting assembly and the auxiliary hoisting assembly with heave compensation, and the dual hoist heave motion compensation system thus enables for providing only the main hoisting assembly with heave compensation and for providing only the auxiliary hoisting assembly with heave compensation.

2. A dual hoist crane, comprising:

a crane structure;

a boom, the boom having an inner end, a midsection and an outer end, the boom being pivotable supported by the crane structure such that the boom can be pivoted about a horizontal boom axis;

a main hoisting assembly, for lifting and lowering a load, the main hoisting assembly comprising a main hoisting winch and an associated main hoisting cable, and a main load suspension device;

an auxiliary hoisting assembly for lifting and lowering a load, the auxiliary hoisting assembly comprising an auxiliary hoisting winch and an associated auxiliary hoisting cable, and an auxiliary load suspension device; and a dual hoist heave motion compensation system, the heave motion compensation system comprising:

a support frame;

a heave compensation cylinder, having a cylinder body mounted on the support frame and a cylinder rod, the heave compensation cylinder being connected to a gas buffer to enable passive heave compensation;

a sheave head, wherein the sheave head is supported by the cylinder rod for movement along a heave compensation trajectory;

a sheave dock, mounted on the support frame at an end of the heave compensation trajectory;

a first set of sheaves guiding the main hoisting cable of the main hoisting assembly; and a second set of sheaves guiding the auxiliary hoisting cable of the auxiliary hoisting assembly, wherein the main hoisting cable extends from the main hoisting winch along the heave compensation trajectory, via the first set of sheaves, and via at least one main hoisting sheave at the outer end of the boom to the main load suspension device, wherein the auxiliary hoisting cable extends from the auxiliary hoisting winch along the heave compensation trajectory, via the second set of sheaves, and via at least one auxiliary hoisting sheave at the outer end of the boom to the auxiliary load suspension device, and wherein the dual hoist heave motion compensation system is configured to individually lock the first set of sheaves and the second set of sheaves to the sheave head, for respectively providing the main hoisting assembly and the auxiliary hoisting assembly with heave compensation, and to individually lock the first set of sheaves and the second set of sheaves to the sheave dock, for respectively not providing the main hoisting assembly and the auxiliary hoisting assembly with heave compensation, and the dual hoist heave motion compensation system thus enables for providing only the main hoisting assembly with heave compensation and for providing only the auxiliary hoisting assembly with heave compensation.

3. The dual hoist crane according to claim 2, wherein the sheaves of the first set of sheaves and the sheaves of the second set of sheaves are configured to be locked to the sheave head and to be locked to the sheave dock.

4. The dual hoist crane according to claim 2, wherein the sheaves of the first set and the sheaves of the second set are mounted in a first sheave block and a second sheave block respectively, and wherein the first sheave block and the second sheave block are configured to be mounted to the sheave head and to be mounted to the sheave dock, to thus lock the sheaves to the sheave head and to lock the sheaves to the sheave dock respectively.

5. The dual hoist crane according to claim 2, wherein the dual hoist crane further comprises locking devices for locking the sheaves, or for locking sheave blocks in which the sheaves are mounted, to the sheave head and the sheave dock.

6. The dual hoist crane according to claim 2, wherein the crane comprises a luffing assembly for pivoting the boom up and down, the luffing assembly comprising:

a luffing winch and an associated luffing cable; and a gantry, the gantry supporting a luffing cable sheave for guiding the luffing cable from the luffing winch to the outer end of the boom.

7. The dual hoist crane according to claim 6, wherein the gantry comprises a back stay and a back frame, the back stay and back frame both at a lower end being pivotably mounted to the crane structure, for pivoting about a horizontal back stay pivot axis and back frame pivot axis respectively, and both at an upper end being pivotably connected to each other, wherein the back frame is located between the back stay and the boom, and wherein the backstay comprises a lower frame section and an upper frame section, the lower frame section and upper frame section being pivotably connected, and wherein the gantry can be lowered by pivoting the lower frame section relative to the upper frame section.

8. The dual hoist crane according to claim 6, wherein the luffing assembly comprises a luffing cable guide arm supporting the at least one luffing cable sheave, the guide arm comprising the at least one boom side sheave, the luffing cable sheave and boom side sheave being spaced relative to each other, for guiding the luffing cable to the boom and spacing part of the luffing cable at a distance from the back stay.

9. The dual hoist crane according to claim 7, wherein the luffing winch is mounted to the gantry, near the back frame pivot axis.

10. The dual hoist crane according to claim 7, wherein the support frame of the heave motion compensation system is mounted in the backstay of the gantry.

11. The dual hoist crane according to claim 2, wherein the dual hoist crane further comprise a tugging track, the tugging track being mounted to the boom and extending along the boom, for guiding a tug-trolley along a length of the boom, the tug trolley being configured to support cables, to be linked to a load supported by the main or auxiliary hoisting assembly, to reduce swing of said load.

12. The dual hoist crane according to claim 2, wherein the boom is provided with a jib, wherein the jib is mounted at the outer end of the boom, and wherein the main hoisting cable is supported at the outer end of the boom and the auxiliary hoisting cable is supported at an outer end of the jib.

13. The dual hoist crane according to claim 2, wherein the number of sheaves of one set is even, and wherein the sheaves of that set are divided into two subsets, each subset comprising the same number of sheaves, and each subset having a sheave head locking position and a sheave dock locking position, in which they are locked to the sheave head and to the sheave dock respectively, wherein the locking positions of the subsets are spaced relative to each other, wherein the sheaves of the other set have a sheave head locking position and a sheave dock locking position, in which they are locked to the sheave head and to the sheave dock respectively, and wherein the sheave head locking position and the sheave dock locking position of the other set are located between the sheave head locking position and the sheave dock locking position of the subsets.

14. A vessel provided with the dual hoist crane according to claim 2.

15. A method for hoisting a load using the dual hoist crane according to claim 2, the method comprising the steps:

locking the first set of sheaves to the sheave head and locking the second set of sheaves to the sheave dock; and hoisting a load with the main hoisting assembly while providing the main hoisting cable with heave motion compensation using the heave motion compensation system; and/or locking the second set of sheaves to the sheave head and locking the first set of sheaves to the sheaves dock; and hoisting a load with the auxiliary hoisting assembly while providing the auxiliary hoisting cable with heave motion compensation using the heave motion compensation system.

16. A method for lowering a gantry of the dual hoist crane according to claim 10, wherein the gantry is configured to be folded into a lowered position, the method comprising the steps:

lowering the boom in a rest position;

setting a hoisting cable under constant tension by using the heave compensation system or the hoisting winch associated with said hoisting cable, to thus load the back stay of the gantry;

initiating pivoting of the lower frame section of the back stay relative to the upper frame section of the back stay by using an actuator; and paying out the luffing cable to lower the gantry until the gantry is in its lowered position.

17. The method for lowering a gantry of the dual hoist crane according to claim 16, wherein paying out the luffing cable to lower the gantry comprises keeping constant tension in the hoisting cable.

18. The dual hoist crane according to claim 7, wherein the support frame of the heave motion compensation system is an integral part of the back stay.

19. The dual hoist crane according to claim 8, wherein the luffing cable guide arm is pivotably mounted to the back frame.

20. A dual hoist heave compensation system for use in the dual hoist crane according to claim 2.

* * * * *